(12) United States Patent
Calvin et al.

(10) Patent No.: US 9,465,762 B2
(45) Date of Patent: *Oct. 11, 2016

(54) COMMUNICATIONS CONTROL SYSTEM WITH A SERIAL COMMUNICATIONS INTERFACE AND A PARALLEL COMMUNICATIONS INTERFACE

(71) Applicant: Bedrock Automation Platforms Inc., San Jose, CA (US)

(72) Inventors: James G. Calvin, Attleboro, MA (US); Albert Rooyakkers, Sunnyvale, CA (US); Pirooz Parvarandeh, Los Altos Hills, CA (US)

(73) Assignee: Bedrock Automation Platforms Inc., San Jose, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/502,006

(22) Filed: Sep. 30, 2014

(65) Prior Publication Data

US 2015/0019790 A1    Jan. 15, 2015

Related U.S. Application Data

(63) Continuation of application No. 13/341,176, filed on Dec. 30, 2011, now Pat. No. 8,868,813.

(51) Int. Cl.
*G06F 13/00* (2006.01)
*G06F 13/40* (2006.01)
(Continued)

(52) U.S. Cl.
CPC ............ *G06F 13/4022* (2013.01); *G06F 1/26* (2013.01); *G06F 13/00* (2013.01); *G06F 13/14* (2013.01); *G06F 2213/0004* (2013.01); *G06F 2213/0022* (2013.01)

(58) Field of Classification Search
CPC ......... G06F 13/00; G06F 13/20; G06F 15/16
See application file for complete search history.

(56) References Cited

U.S. PATENT DOCUMENTS 4,403,286 A * 9/1983 Fry .................. G06F 9/505
  710/15
4,628,308 A   12/1986 Robert
(Continued)

FOREIGN PATENT DOCUMENTS

EP        2317743       5/2011

OTHER PUBLICATIONS

Pending U.S. Appl. No. 14/501,974 filed on Sep. 30, 2014.
(Continued)

*Primary Examiner* — Henry Tsai
*Assistant Examiner* — Christopher a Daley
(74) *Attorney, Agent, or Firm* — Advent, LLP (57) ABSTRACT

A communications control system is disclosed that includes a serial communications interface and a parallel communications interface for coupling a plurality of input/output modules with a control module. The serial communications interface is configured for connecting the plurality of input/output modules to the control module in parallel to transmit information between the plurality of input/output modules and the control module, and the parallel communications interface is configured for separately connecting the plurality of input/output modules to the control module to transmit information between the plurality of input/output modules and the control module, and to transmit information between individual ones of the plurality of input/output modules. The serial communications interface may comprise a multidrop bus, and the parallel communications interface may comprise a cross switch.

17 Claims, 9 Drawing Sheets

(51) Int. Cl.
*G06F 13/14* (2006.01)
*G06F 1/26* (2006.01)
*G06F 13/20* (2006.01)

(56) References Cited

U.S. PATENT DOCUMENTS

| | | | |
|---|---|---|---|
| 4,656,622 A | 4/1987 | Lea | |
| 4,691,384 A | 9/1987 | Jobe | |
| 4,882,702 A | 11/1989 | Struger et al. | |
| 4,929,939 A | 5/1990 | Varma et al. | |
| 5,590,284 A | 12/1996 | Crosetto | |
| 5,602,754 A | 2/1997 | Beatty et al. | |
| 5,951,666 A | 9/1999 | Ilting et al. | |
| 6,680,904 B1 | 1/2004 | Kaplan et al. | |
| 6,812,803 B2 | 11/2004 | Goergen | |
| 6,988,162 B2 | 1/2006 | Goergen | |
| 7,200,692 B2 | 4/2007 | Singla et al. | |
| 7,254,452 B2 | 8/2007 | Davlin et al. | |
| 7,526,676 B2 | 4/2009 | Chou et al. | |
| 7,529,862 B2 * | 5/2009 | Isani | G06F 13/28 710/110 |
| 7,761,640 B2 * | 7/2010 | Hikabe | G06F 9/4411 710/300 |
| 7,774,074 B2 | 8/2010 | Davlin et al. | |
| 8,266,360 B2 * | 9/2012 | Agrawal | G06F 13/423 710/305 |
| 8,310,380 B2 | 11/2012 | Aria et al. | |
| 8,380,905 B2 | 2/2013 | Djabbari et al. | |
| 8,862,802 B2 | 10/2014 | Calvin et al. | |
| 2002/0086678 A1 | 7/2002 | Salokannel et al. | |
| 2002/0171525 A1 | 11/2002 | Kobayashi et al. | |
| 2003/0202330 A1 | 10/2003 | Lopata et al. | |
| 2007/0076768 A1 | 4/2007 | Chiesa et al. | |
| 2007/0174524 A1 * | 7/2007 | Kato | G06F 13/4018 710/71 |
| 2007/0260897 A1 * | 11/2007 | Cochran | G06F 1/263 713/300 |
| 2008/0123669 A1 | 5/2008 | Oliveti et al. | |
| 2008/0194124 A1 | 8/2008 | Di Stefano | |
| 2009/0245245 A1 | 10/2009 | Malwankar et al. | |
| 2010/0052428 A1 | 3/2010 | Imamura et al. | |
| 2011/0296066 A1 | 12/2011 | Xia | |
| 2012/0284354 A1 | 11/2012 | Mukundan et al. | |
| 2012/0297101 A1 | 11/2012 | Neupartl et al. | |

OTHER PUBLICATIONS

Search Report and Written Opinion dated Apr. 29, 2013 in International Application #PCT/US2012/072056.

* cited by examiner

910 COUPLE INPUT/OUTPUT MODULES WITH A CONTROL MODULE

920 CONNECT THE INPUT/OUTPUT MODULES TO THE CONTROL MODULE IN PARALLEL FOR TRANSMITTING INFORMATION BETWEEN THE INPUT/OUTPUT MODULES AND THE CONTROL MODULE

922 CONNECT THE INPUT/OUTPUT MODULES TO THE CONTROL MODULE USING A MULTIDROP BUS

930 SEPARATELY CONNECT THE INPUT/OUTPUT MODULES TO THE CONTROL MODULE FOR TRANSMITTING INFORMATION BETWEEN THE INPUT/OUTPUT MODULES AND THE CONTROL MODULE, AND FOR TRANSMITTING INFORMATION BETWEEN INDIVIDUAL ONES OF THE INPUT/OUTPUT MODULES

932 SEPARATELY CONNECT THE INPUT/OUTPUT MODULES TO THE CONTROL MODULE USING A CROSS SWITCH

940 COUPLE THE INPUT/OUTPUT MODULES WITH A REDUNDANT CONTROL MODULE

950 CONNECT THE INPUT/OUTPUT MODULES TO THE REDUNDANT CONTROL MODULE IN PARALLEL

960 SEPARATELY CONNECT THE INPUT/OUTPUT DEVICES TO THE REDUNDANT CONTROL MODULE

970 COUPLE THE CONTROL MODULE WITH A NETWORK FOR TRANSMITTING INFORMATION COLLECTED FROM THE INPUT/OUTPUT MODULES VIA THE NETWORK

980 COUPLE THE INPUT/OUTPUT MODULES WITH A POWER MODULE FOR SUPPLYING ELECTRICAL POWER TO THE INPUT/OUTPUT MODULES

FIG. 9

COMMUNICATIONS CONTROL SYSTEM WITH A SERIAL COMMUNICATIONS INTERFACE AND A PARALLEL COMMUNICATIONS INTERFACE

BACKGROUND

Industrial and process control systems include various types of control equipment used in industrial production, such as Supervisory Control and Data Acquisition (SCADA) systems, Distributed Control Systems (DCS), and other control equipment using, for example, Programmable Logic Controllers (PLC). These control systems are typically used in industries including electrical, water, oil, gas, and data. Using information collected from remote stations in the field, automated and/or operator-driven supervisory commands can be transmitted to field control devices. These field devices control local operations, such as opening and closing valves and breakers, collecting data from sensor systems, and monitoring a local environment for alarm conditions.

For example, SCADA systems typically use open-loop control with sites that may be widely separated geographically, using potentially unreliable or intermittent low-bandwidth/high-latency links. These systems use Remote Terminal Units (RTUs) to send supervisory data to a control center. The RTUs may have a limited capacity for local controls when the master station is not available. DCS systems are generally used for real time data collection and control with high-bandwidth, low-latency data networks. PLCs typically provide Boolean logic operations, timers, continuous control, and so on. However, as industrial control systems evolve, new technologies are combining aspects of these various types of control systems. For instance, Programmable Automation Controllers (PACs) can include aspects of SCADA, DCS, and PLCs.

SCADA systems can be used with industrial processes, including manufacturing, production, power generation, fabrication, and refining. They can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

SUMMARY

A communications control system is disclosed. In one or more implementations, the communications control system includes a serial communications interface and a parallel communications interface for coupling a plurality of input/output modules with a control module. The serial communications interface is configured for connecting the plurality of input/output modules to the control module in parallel to transmit information between the plurality of input/output modules and the control module, and the parallel communications interface is configured for separately connecting the plurality of input/output modules to the control module to transmit information between the plurality of input/output modules and the control module, and to transmit information between individual ones of the plurality of input/output modules. The serial communications interface may comprise a multidrop bus, and the parallel communications interface may comprise a cross switch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Process control systems typically use two types of busses: multidrop busses and parallel backplanes. A multidrop serial bus with a master and multiple slave devices may be used for distributed control systems where reliability is critical, such as safety-critical systems, and the like. However, as additional devices are connected to a multidrop serial bus, data transfer speeds between components within the system may slow considerably. A parallel backplane may be used where multiple devices are connected in parallel, such as with programmable logic controllers. Parallel backplanes offer increased data transfer speeds compared to multidrop serial busses. However, parallel backplanes do not offer redundancy for safety-critical systems.

Accordingly, communications control systems are described that include a switch fabric having a serial communications interface (e.g., a serial or Multidrop Bus (MDB) with a master and multiple slaves) and a parallel communications interface (e.g., a parallel or point-to-point bus implemented using a cross switch, or the like). The serial communications interface and the parallel communications interface may be used for connecting multiple Input/Output (I/O) modules to communications/control modules, and to one another.

In some implementations, the serial communications interface and the parallel communications interface may be formed on a single printed circuit board. The serial communications interface may be configured for connecting the plurality of input/output modules to a redundant control module in parallel, and the parallel communications interface may be configured for separately connecting the plurality of input/output modules to the redundant control module. Information transmitted via the serial communications interface and/or the parallel communications interface may be packetized. The control module may comprise a network interface for transmitting information collected from the plurality of input/output modules via a network, and so forth. Additionally, the communications control system may include a power module for supplying electrical power to at least one of the plurality of input/output modules.

A communications control system configured in accordance with the present disclosure may provide deterministic behavior (e.g., with respect to data turnaround time) and reliability for critical systems, while still providing speed and scalability. The communications control system may provide fault isolation, along with data turnaround times that do not increase as additional components are added to a system. Further, the communications control system may allow components connected to the system to communicate directly with one another using the communications control system. Communications control systems configured in this manner may be implemented in various systems that may otherwise use a parallel backplane.

Example Implementations

FIGS. 1 through 8 illustrate an example communications control system 100 in accordance with the present disclosure. In implementations, the communications control system 100 may be configured for use with process control systems technology, and so forth. For example, the communications control system 100 may be used with a distributed control system comprised of controller elements and subsystems, where the subsystems are controlled by one or more controllers distributed throughout the system. The communications control system 100 includes a switch fabric 102 comprising a serial communications interface 104 and a parallel communications interface 106 for furnishing communications with a number of I/O modules 108.

Figure 1:
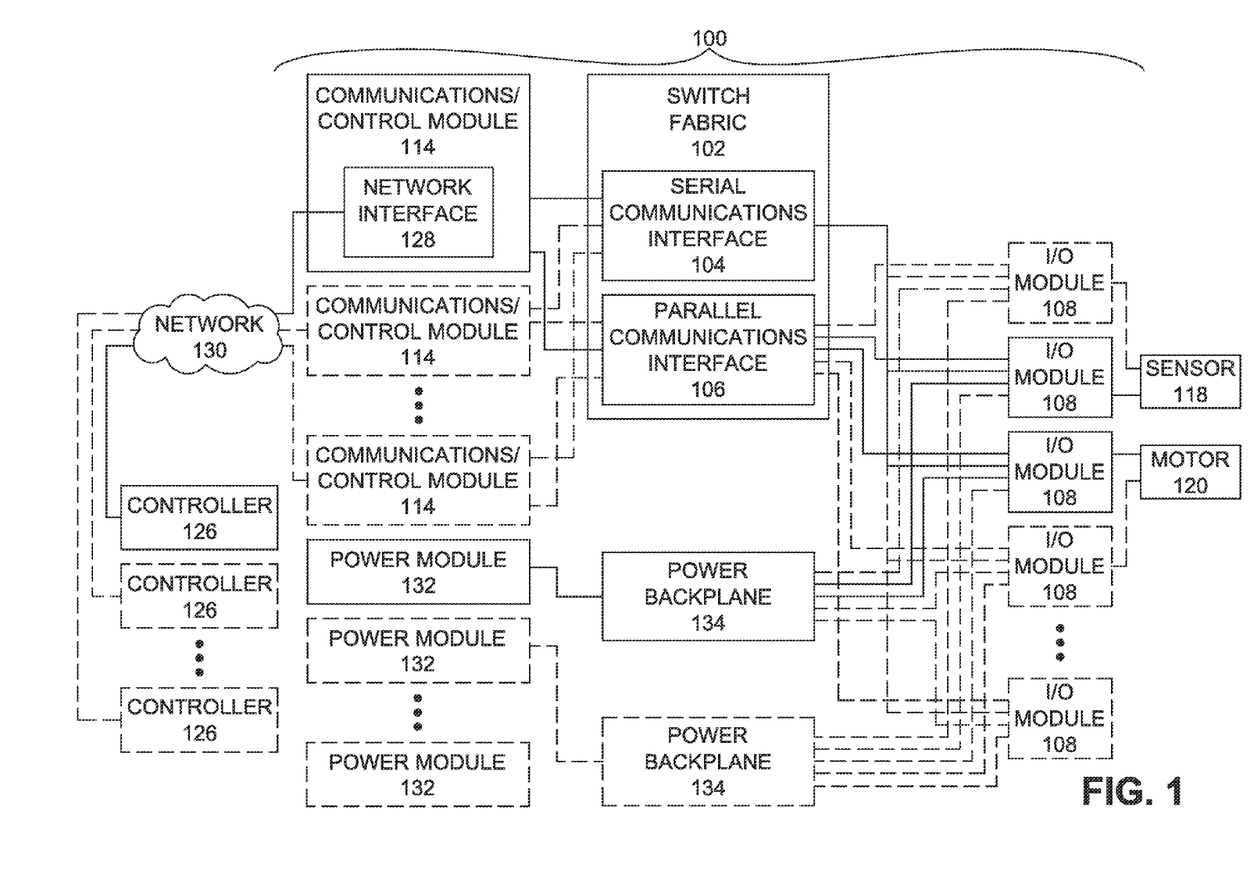
FIG. 1 is a block diagram illustrating a communications control system in accordance with example implementations of the present disclosure.

The serial communications interface 104 may be implemented using a group of connectors connected in parallel with one another. For example, the serial communications interface 104 may be implemented using a multidrop bus 110, or the like. In implementations, the multidrop bus 110 may be used for configuration and diagnostic functions of the I/O modules 108. The parallel communications interface 106 allows multiple signals to be transmitted simultaneously over multiple dedicated high speed parallel communication channels. For instance, the parallel communications interface 106 may be implemented using a cross switch 112, or the like.

Figure 2:
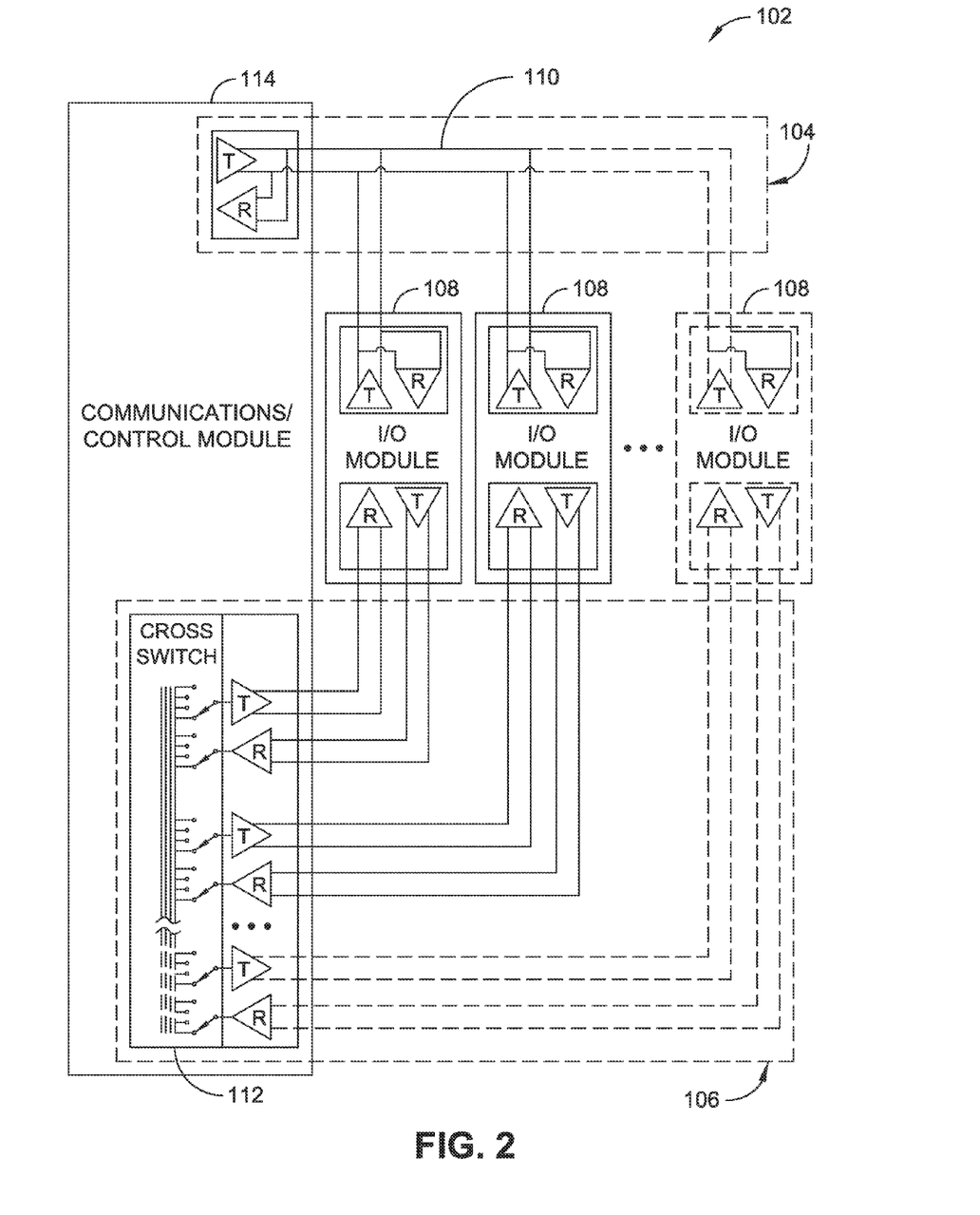
FIG. 2 is a circuit diagram illustrating a switch fabric for a communications control system in accordance with example implementations of the present disclosure.
Figure 3:
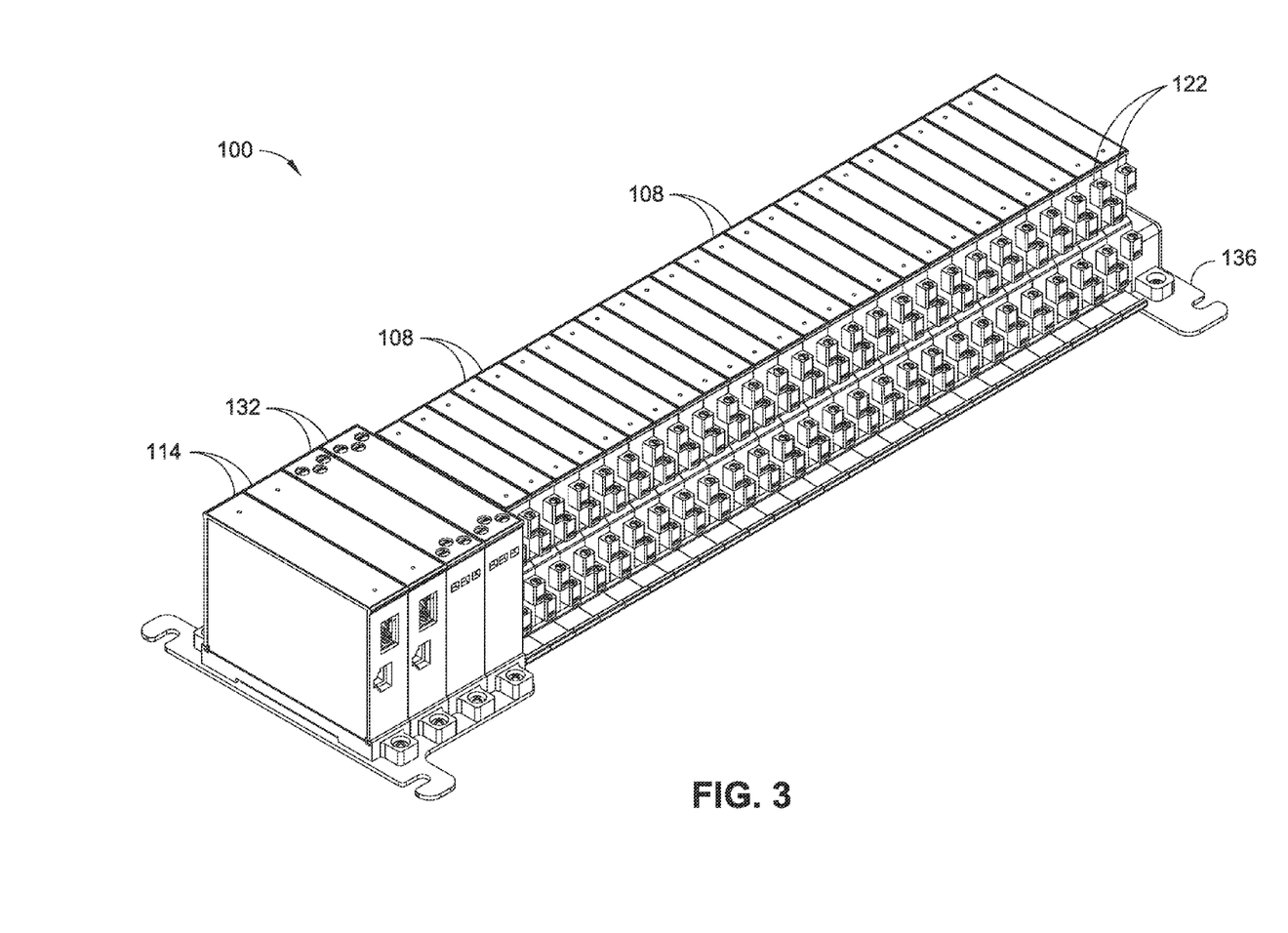
FIG. 3 is an isometric view illustrating a communications control system in accordance with example implementations of the present disclosure.
Figure 4:
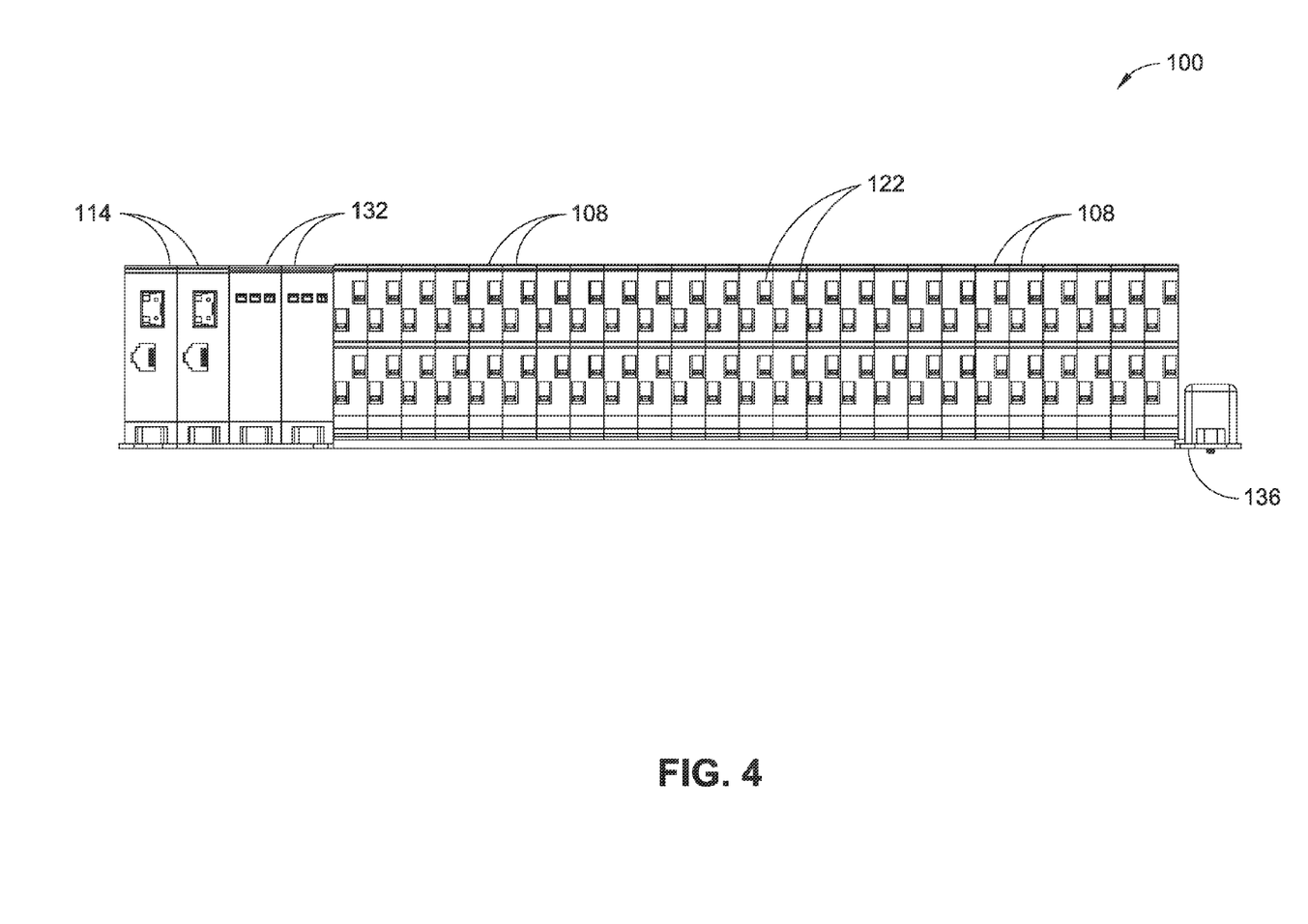
FIG. 4 is a side elevation view of the communications control system illustrated in FIG. 3.
Figure 5:
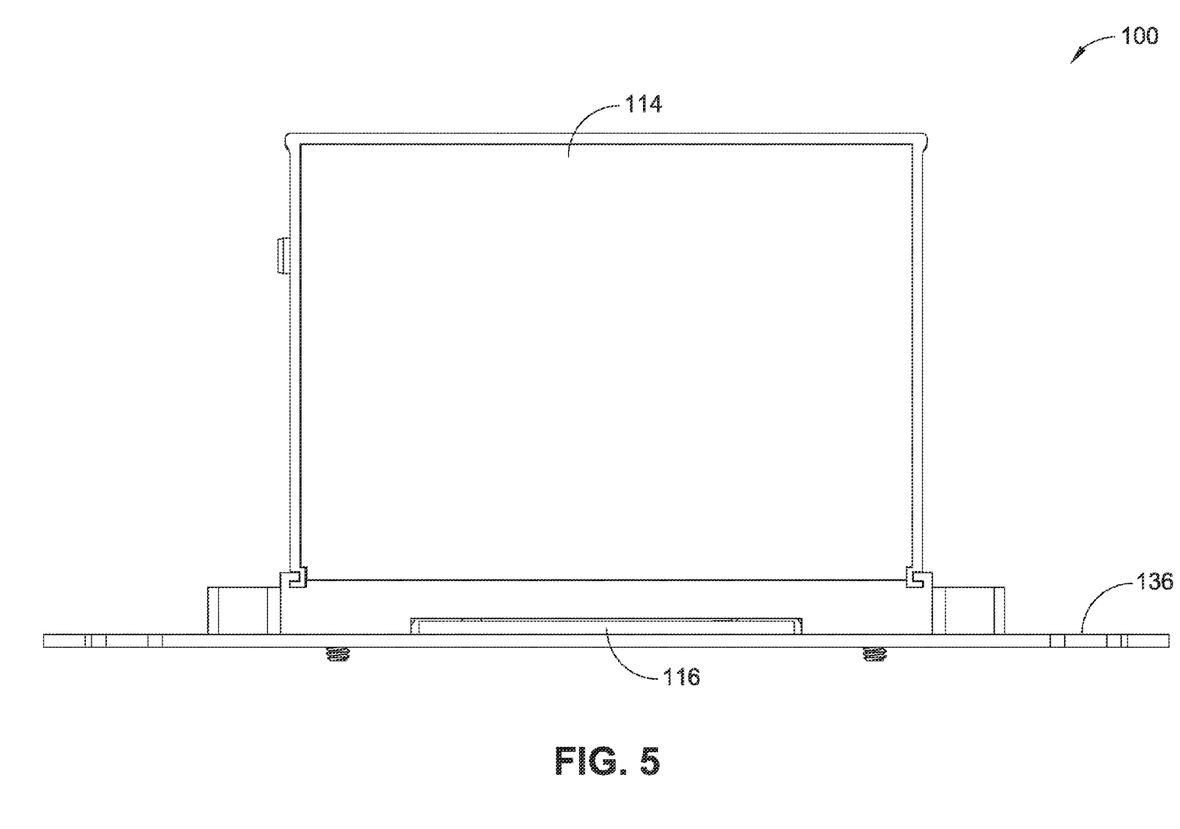
FIG. 5 is an end view of the communications control system illustrated in FIG. 3.
Figure 6:
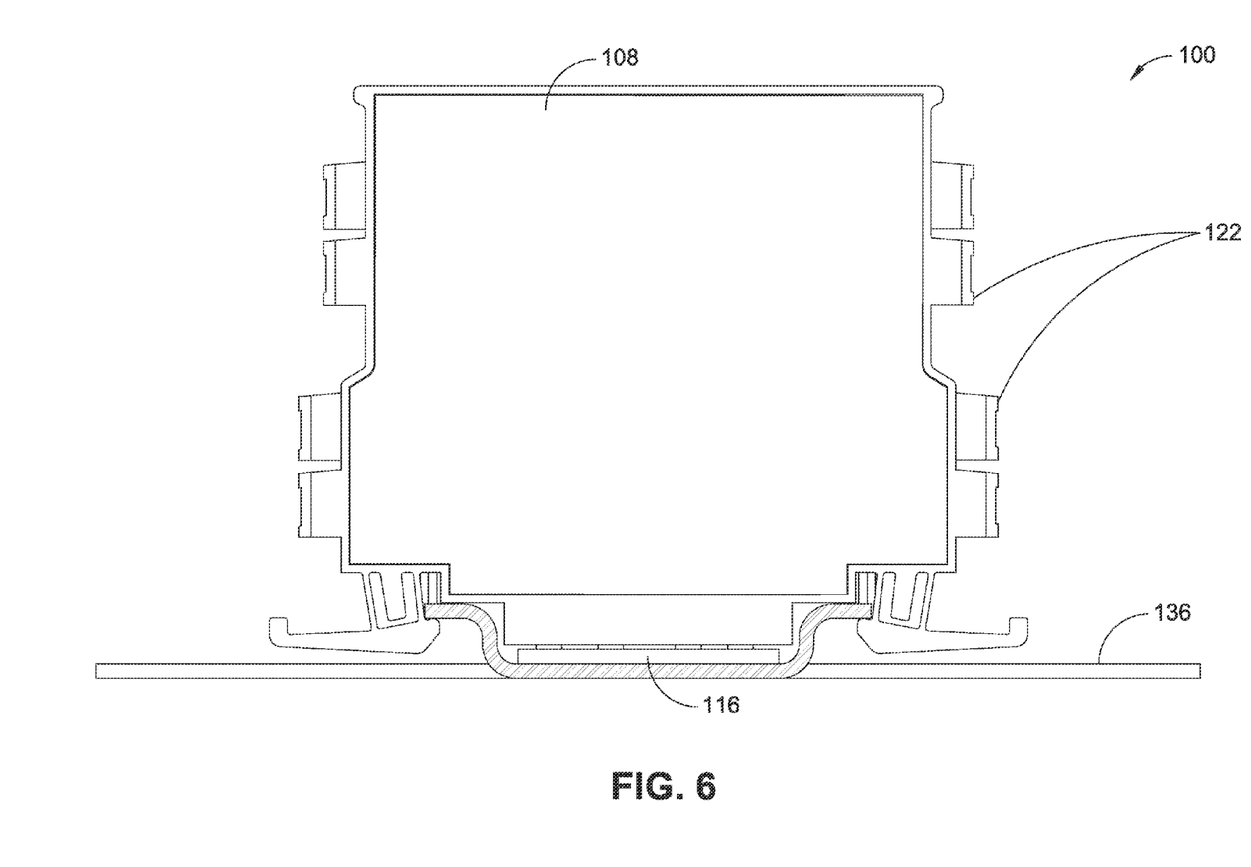
FIG. 6 is a partial cross-sectional end view of the communications control system illustrated in FIG. 3.
Figure 7:
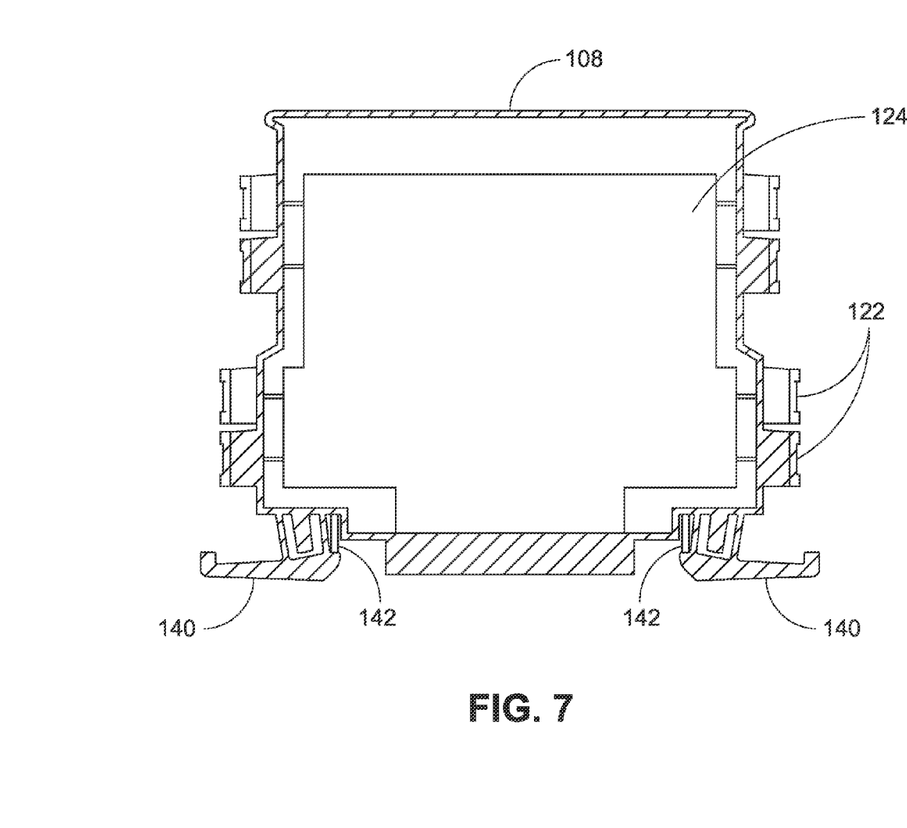
FIG. 7 is a cross-sectional view illustrating an input/output module for the communications control system illustrated in FIG. 3.
Figure 8:
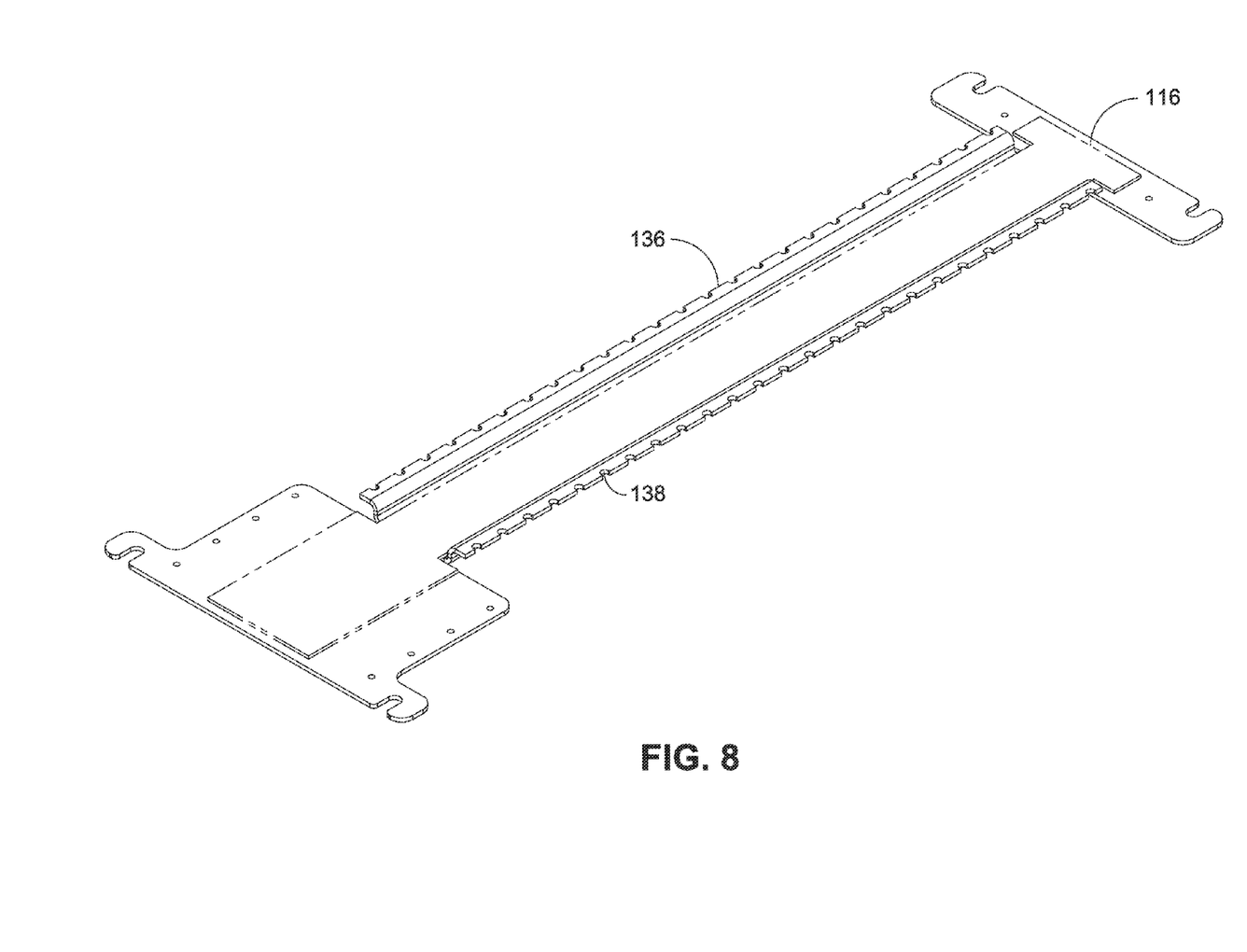
FIG. 8 is an isometric view illustrating a support frame for the communications control system illustrated in FIG. 3.

In a particular implementation, as described in FIG. 2, the parallel communications interface 106 can be implemented using a four (4) wire full duplex cross switch 112 with a dedicated connection to each I/O module 108. For example, the cross switch 112 can be implemented as a programmable cross switch connecting point-to-point busses and allowing traffic between the I/O modules 108. The cross switch 112 may be configured by a master device, such as a communications/control module 114. For example, a communications/control module 114 may configure one or more sets of registers included in the cross switch 112 to control traffic between the I/O modules 108. In implementations, a communications/control module 114 may comprise a rule set dictating how the I/O modules 106 are interconnected. For example, a communications/control module 114 may comprise a set of registers, where each register defines the operation of a particular switch (e.g., with respect to how packets are forwarded, and so forth). Thus, the cross switch 112 may not necessarily auto-configure, instead implementing a configuration provided by a communications/control module 114. However, this configuration is provided by way of example only and is not meant to be restrictive of the present disclosure. Thus, in other implementations, the cross switch 112 may auto-configure.

The parallel communications interface 106 may be used for data collection from the I/O modules 108. Further, because each I/O module 108 has its own private bus to the master (e.g., communications/control modules 114), each I/O module 108 can communicate with the master at the same time. Thus, the total response time for the communications control system 100 may be limited to that of the slowest I/O module 108, instead of the sum of all slave devices.

In implementations, the switch fabric 102, the serial communications interface 104, and the parallel communications interface 106 may be implemented in a single, monolithic circuit board 116. However, this configuration is provided by way of example only and is not meant to be restrictive of the present disclosure. Thus, the serial communications interface 104 and the parallel communications interface 106 may be implemented using different arrangements of multiple components, such as multiple discrete semiconductor devices for implementing the serial communications interface 104 and the parallel communications interface 106 separately, and so forth.

The switch fabric 102 may be configured for connecting one or more I/O modules 108 and transmitting data to and from the I/O modules 108. The I/O modules 108 may comprise input modules, output modules, and/or input and output modules. For instance, input modules can be used to receive information from input instruments in the process or the field, while output modules can be used to transmit instructions to output instruments in the field. For example, an I/O module 108 can be connected to a process sensor, such as a sensor 118 for measuring pressure in piping for a gas plant, a refinery, and so forth. In implementations, the I/O modules 116 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, the I/O module 108 may be configured to convert analog data received from the sensor 118 to digital data (e.g., using Analog-to-Digital Converter (ADC) circuitry, and so forth). An I/O module 108 may also be connected to a motor 120 and configured to control one or more operating characteristics of the motor 120, such as motor speed, motor torque, and so forth. Further, the I/O module 108 may be configured to convert digital data to analog data for transmission to the motor 120 (e.g., using Digital-to-Analog (DAC) circuitry, and so forth). In implementations, one or more of the I/O modules 108 may comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the I/O modules 108 can be used to provide fault tolerant and redundant connections for a communications sub-bus.

Each I/O module 108 may be provided with a unique identifier (ID) for distinguishing one I/O module 108 from another I/O module 108. In implementations, an I/O module 108 may be identified by its ID when it is connected to the communications control system 100. Multiple I/O modules 108 can be used with the communications control system 100 to provide redundancy. For example, two or more I/O modules 108 can be connected to the sensor 118 and/or the motor 120, as described in FIG. 1. Each I/O module 108 can include one or more ports 122 furnishing a physical connection to hardware and circuitry included with the I/O module 108, such as a Printed Circuit Board (PCB) 124, and so forth.

One or more of the I/O modules 108 may include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 108 may include a connection for connecting an I/O module 108 to a computer bus, and so forth.

The switch fabric 102 may be coupled with one or more communications/control modules 114 for monitoring and controlling the I/O modules 108, and for connecting the I/O modules 108 together. The communications/control module(s) 114 may be used to configure the cross switch 112. For example, a communications/control module 114 may update a routing table when an I/O module 108 is connected to the communications control system 100 based upon a unique ID for the I/O module 108. Further, when multiple redundant I/O modules 108 are used, each communications/control module 114 can implement mirroring of informational databases regarding the I/O modules 108 and update them as data is received from and/or transmitted to the I/O modules 108. In some implementations, two or more communications/control modules 114 may be used to provide redundancy.

Data transmitted using the switch fabric 102 may be packetized, i.e., discrete portions of the data may be converted into data packets comprising the data portions along with network control information, and so forth. The communications control system 100 may use one or more protocols for data transmission, including a bit-oriented synchronous data link layer protocol such as High-Level Data Link Control (HDLC). In a specific instance, the communications control system 100 may implement HDLC according to an International Organization for Standardization (ISO) 13239 standard, or the like. Further, two or more communications/control modules 114 can be used to implement redundant HDLC. However, it should be noted that HDLC is provided by way of example only and is not meant to be restrictive of the present disclosure. Thus, the communications control system 100 may use other various communications protocols in accordance with the present disclosure.

One or more of the communications/control modules 114 may be configured for exchanging information with components used for monitoring and/or controlling the instrumentation connected to the switch fabric 102 via the I/O modules 108, such as one or more control loop feedback mechanisms/controllers 126. In implementations, a controller 126 can be configured as a microcontroller/Programmable Logic Controller (PLC), a Proportional-Integral-Derivative (PID) controller, and so forth. One or more of the communications/control modules 114 may include a network interface 128 for connecting the communications control system 100 to a controller 126 via a network 130. In implementations, the network interface 128 may be configured as a Gigabit Ethernet interface for connecting the switch fabric 102 to a Local Area Network (LAN). Further, two or more communications/control modules 114 can be used to implement redundant Gigabit Ethernet. However, it should be noted that Gigabit Ethernet is provided by way of example only and is not meant to be restrictive of the present disclosure. Thus, the network interface 128 may be configured for connecting the communications control system 100 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 128 may be implemented using computer bus. For example, the network interface 128 can include a Peripheral Component Interconnect (PCI) card interface, such as a Mini PCI interface, and so forth. Further, the network 130 may be configured to include a single network or multiple networks across different access points.

The communications control system 100 may include one or more power modules 132 for supplying electrical power to field devices via the I/O modules 108. One or more of the power modules 132 may include an AC-to-DC (AC/DC) converter for converting Alternating Current (AC) (e.g., as supplied by AC mains, and so forth) to Direct Current (DC) for transmission to a field device, such as the motor 120 (e.g., in an implementation where the motor 120 comprises a DC motor). Two or more power modules 132 can be used to provide redundancy. For example, as shown in FIG. 1, two power modules 132 can be connected to each of the I/O modules 108 using a separate power backplane 134 for each power module 132.

The communications control system 100 may be implemented using a support frame 136. The support frame 136 may be used to support and/or interconnect the communications/control module(s) 114, the power module(s) 132, the switch fabric 102, the power backplane(s) 134, and/or the I/O modules 108. The circuit board 116 may be mounted to the support frame 136 using a fastener such as, for example, double sided tape, adhesive, or mechanical fasteners (e.g., screws, bolts, etc.). The support frame 136 may include slots 138 to provide registration for the I/O modules 108, such as for aligning connectors of the I/O modules 108 with connectors included with the circuit board 116 and/or connectors of a power backplane 134. For example, an I/O module 108 may include connectors 140 having tabs/posts 142 for inserting into slots 138 and providing alignment of the I/O module 108 with respect to the circuit board 116. In implementations, one or more of the connectors 140 may be constructed from a thermally conductive material (e.g., metal) connected to a thermal plane of PCB 124 to conduct heat generated by components of the PCB 124 away from the PCB 124 and to the support frame 136, which itself may be constructed of a thermally conductive material (e.g., metal). Further, the communications control system 100 may associate a unique physical ID with each physical slot 138 to uniquely identify each I/O module 108 coupled with a particular slot 138. For example, the ID of a particular slot 138 can be associated with an I/O module 108 coupled with the slot 138 and/or a second ID uniquely associated with the I/O module 108. Further, the ID of a particular I/O module 108 can be used as the ID for a slot 138 when the I/O module 108 is coupled with the slot 138. The support frame 136 can be constructed for cabinet mounting, rack mounting, wall mounting, and so forth.

It should be noted that while the communications control system 100 is described in the accompanying figures as including one switch fabric 102, more than one switch fabric 102 may be provided with communications control system 100. For example, two or more switch fabrics 102 may be used with the communications control system 100 (e.g., to provide physical separation between redundant switch fabrics 102, and so forth). Each one of the switch fabrics 102 may be provided with its own support frame 136. Further, while both the serial communications interface 104 and the parallel communications interface 106 are described as included in a single switch fabric 102, it will be appreciated that physically separate switch fabrics may be provided, where one switch fabric includes the serial communications interface 104, and another switch fabric includes the parallel communications interface 106.

Example Process

Figure 9:
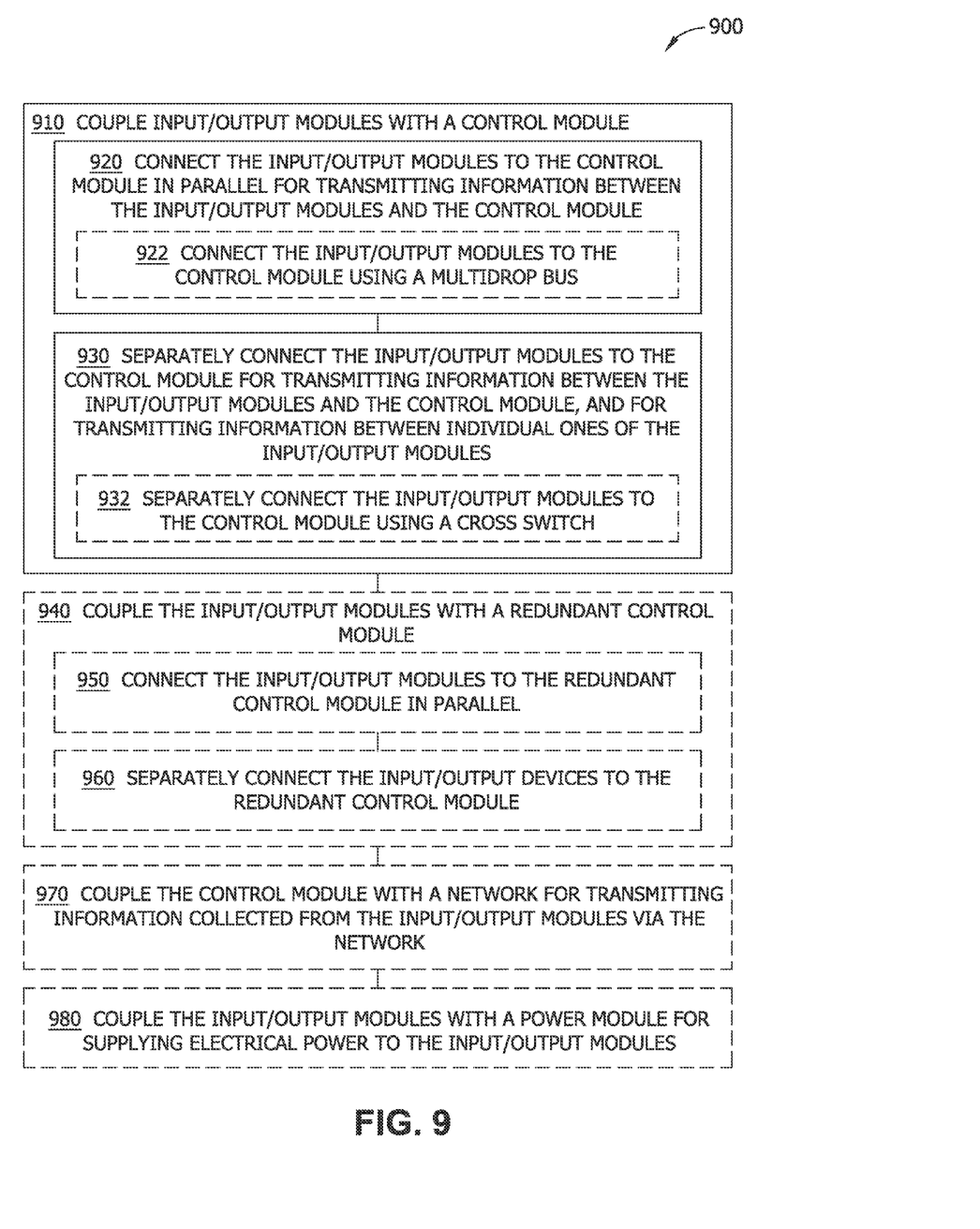
FIG. 9 is a flow diagram illustrating a process for furnishing communication between multiple input/output modules and one or more communications/control modules in accordance with example implementations of the present disclosure.

Referring now to FIG. 9, example techniques for furnishing communication between multiple input/output devices and one or more communications/control modules using a communications control system that includes a serial communications interface and a parallel communications interface for coupling a plurality of input/output modules with a control module are described.

FIG. 9 depicts a process 900, in an example implementation, for furnishing a communications control system, such as the communications control system 100 illustrated in FIGS. 1 through 8 and described above. In the process 900 illustrated, input/output modules are coupled with a control module (Block 910). For example, with reference to FIGS. 1 through 8, the switch fabric 102 may be configured for connecting the I/O modules 108 to the communications/control modules 114, and transmitting data to and from the I/O modules 108. The input/output modules are connected to the control module in parallel for transmitting information between the input/output modules and the control module (Block 920). In one or more implementations, the input/output modules can be connected to the control module using a multidrop bus (Block 922). For instance, with continuing reference to FIGS. 1 through 8, the serial communications interface 104 of the switch fabric 102 may be implemented using a multidrop bus 110. The input/output modules are separately connected to the control module for transmitting information between the input/output modules and the control module, and for transmitting information between individual ones of the input/output modules (Block 930). In one or more implementations, the input/output modules can be separately connected to the control module using a cross switch (Block 932). For example, with continuing reference to FIGS. 1 through 8, the parallel communications interface 106 of the switch fabric 102 may be implemented using a cross switch 112 comprising a four (4) wire full duplex system with a dedicated connection to each I/O module 108.

In some implementations, the input/output modules are coupled with a redundant control module (Block 940). The input/output modules can be connected to the redundant control module in parallel (Block 950). The input/output devices can also be separately connected to the redundant control module (Block 960). For instance, with continuing reference to FIGS. 1 through 8, two or more communications/control modules 114 can be used to implement a redundant HDLC data link layer protocol. It should be noted that connecting the input/output modules to one redundant control module is provided by way of example only and is not meant to be restrictive of the present disclosure. Thus, the input/output modules may be connected to more than one redundant control module in parallel and/or separately.

In some implementations, the control module can be coupled with a network for transmitting information collected from the input/output modules via the network (Block 970). For example, with continuing reference to FIGS. 1 through 8, one or more of the communications/control modules 114 may include a network interface 128 for connecting the communications control system 100 to a controller 126 via a network 130. The input/output modules can also be coupled with a power module for supplying electrical power to the input/output modules (Block 980). For instance, with continuing reference to FIGS. 1 through 8, one or more power modules 132 may be included with the communications control system 100 for supplying electrical power to field devices via the I/O modules 108.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A communications control system comprising:
a control module;
a plurality of input/output modules coupled with the control module;
a serial communications interface configured for connecting the plurality of input/output modules to the control module in parallel, the serial communications interface configured for transmitting information between the plurality of input/output modules and the control module;

a parallel communications interface configured for separately connecting the plurality of input/output modules to the control module, the parallel communications interface configured for transmitting information between the plurality of input/output modules and the control module, and transmitting information between individual ones of the plurality of input/output modules; and a support frame to facilitate interconnection of the plurality of input/output modules and the control module, the support frame comprising a plurality of slots, each slot of the plurality of slots for receiving a respective one of the plurality of input/output modules, each slot of the plurality of slots associated with a unique identification, wherein an input/output module coupled with the support frame at a respective slot can identify itself to the control module using the unique identification associated with the respective slot.

2. The communications control system as recited in claim 1, wherein the serial communications interface comprises a multidrop bus.

3. The communications control system as recited in claim 1, wherein the parallel communications interface comprises a cross switch.

4. The communications control system as recited in claim 1, wherein the serial communications interface is configured for connecting the plurality of input/output modules to a redundant control module in parallel, and the parallel communications interface is configured for separately connecting the plurality of input/output modules to the redundant control module.

5. The communications control system as recited in claim 1, wherein information transmitted via at least one of the serial communications interface or the parallel communications interface is packetized.

6. The communications control system as recited in claim 1, wherein the control module comprises a network interface for transmitting information collected from the plurality of input/output modules via a network.

7. The communications control system as recited in claim 1, further comprising a power module for supplying electrical power to at least one of the plurality of input/output modules.

8. A process comprising:
coupling a plurality of input/output modules with a control module using a support frame to facilitate interconnection of the plurality of input/output modules and the control module, the support frame comprising a plurality of slots, each slot of the plurality of slots for receiving a respective one of the plurality of input/output modules, each slot of the plurality of slots associated with a unique identification;
connecting the plurality of input/output modules to the control module in parallel for transmitting information between the plurality of input/output modules and the control module; and
separately connecting the plurality of input/output modules to the control module for transmitting information between the plurality of input/output modules and the control module, and transmitting information between individual ones of the plurality of input/output modules, wherein an input/output module coupled with the support frame at a respective slot can identify itself to the control module using the unique identification associated with the respective slot.

9. The process as recited in claim 8, wherein connecting the plurality of input/output modules to the control module in parallel comprises connecting the plurality of input/output modules to the control module using a multidrop bus.

10. The process as recited in claim 8, wherein separately connecting the plurality of input/output modules to the control module comprises separately connecting the plurality of input/output modules to the control module using a cross switch.

11. The process as recited in claim 8, further comprising:
coupling the plurality of input/output modules with a redundant control module;
connecting the plurality of input/output modules to the redundant control module in parallel; and
separately connecting the plurality of input/output modules to the redundant control module.

12. The process as recited in claim 8, wherein at least one of transmitting information between the plurality of input/output modules and the control module or transmitting information between individual ones of the plurality of input/output modules comprises packetizing the transmitted information.

13. The process as recited in claim 8, further comprising coupling the control module with a network for transmitting information collected from the plurality of input/output modules via the network.

14. The process as recited in claim 8, further comprising coupling at least one of the plurality of input/output modules with a power module for supplying electrical power to the at least one of the plurality of input/output modules.

15. A communications control system comprising:
a control module;
a plurality of input/output modules coupled with the control module;
a multidrop bus configured for connecting the plurality of input/output modules to the control module in parallel, the multidrop bus configured for transmitting information between the plurality of input/output modules and the control module;
a cross switch configured for separately connecting the plurality of input/output modules to the control module, the cross switch configured for transmitting information between the plurality of input/output modules and the control module, and transmitting information between individual ones of the plurality of input/output modules; and
a support frame to facilitate interconnection of the plurality of input/output modules and the control module, the support frame comprising a plurality of slots, each slot of the plurality of slots for receiving a respective one of the plurality of input/output modules, each slot of the plurality of slots associated with a unique identification, wherein an input/output module coupled with the support frame at a respective slot can identify itself to the control module using the unique identification associated with the respective slot.

16. The communications control system as recited in claim 15, wherein the multidrop bus is configured for connecting the plurality of input/output modules to a redundant control module in parallel, and the cross switch is configured for separately connecting the plurality of input/output modules to the redundant control module.

17. The communications control system as recited in claim 15, wherein information transmitted via at least one of the multidrop bus or the cross switch is packetized.

* * * * *